United States Patent
Latham

[19]

[11] Patent Number: 5,803,738
[45] Date of Patent: Sep. 8, 1998

[54] APPARATUS FOR ROBOTIC FORCE SIMULATION

[75] Inventor: Roy Westlake Latham, Fremont, Calif.

[73] Assignee: CGSD Corporation, Mountain View, Calif.

[21] Appl. No.: 692,422

[22] Filed: Aug. 5, 1996

Related U.S. Application Data

[63] Continuation of Ser. No. 264,924, Jun. 24, 1994, abandoned.

[51] Int. Cl.[6] .............................. G09B 9/02; G09B 19/16
[52] U.S. Cl. ......................... 434/29; 434/45; 434/307 R; 434/365; 345/157; 395/807; 348/123
[58] Field of Search ............................... 434/307 R, 308, 434/29, 45, 43, 69, 219, 365, 30; 301/1, 7, 95; 345/8, 179, 156, 157; 395/152, 154, 155, 806, 807, 501, 173, 125; 364/578; 340/686, 706; 348/14, 123

[56] References Cited

U.S. PATENT DOCUMENTS

| | | | |
|---|---|---|---|
| 5,184,319 | 2/1993 | Kramer | 364/578 X |
| 5,185,561 | 2/1993 | Good et al. | 345/156 X |
| 5,286,202 | 2/1994 | de Gyarfas et al. | 434/43 |
| 5,319,387 | 6/1994 | Yoshikawa | 345/157 X |
| 5,320,538 | 6/1994 | Baum | 434/307 R |
| 5,389,865 | 2/1995 | Jacobus et al. | 901/7 X |
| 5,429,140 | 7/1995 | Burdea et al. | 128/774 |
| 5,495,576 | 2/1996 | Ritchey | 395/154 X |

OTHER PUBLICATIONS

"Virtual Environment Dsiplay System" by Fisher et al, ACM Workshop on Interactive 3D Graphics, Oct. 23–24, 1986, pp. 1–11.

"Infaces for Advanced Computing" by James, D. Foley, Scientific American, Oct. 1987, pp. 127–130, 132, 134 and 135.

*Primary Examiner*—Joe Cheng
*Attorney, Agent, or Firm*—Douglas M. Clarkson

[57] ABSTRACT

A system for simulating the forces associated with touching objects in a virtual reality simulator system includes a panel that contains an example of the various types of switches, knobs and any other item or object being simulated that is to be touched by a user of the system. The panel is attached as the payload of a robotic positioning device controlled by a computer. The computer is connected to a tracker and a flexible lightweight data glove worn by the user. The computer maintains a database that includes the positions of all of the controls being simulated by the system. The computer uses the trajectory data to determine the position of the robotic device.

12 Claims, 5 Drawing Sheets

APPARATUS FOR ROBOTIC FORCE SIMULATION

This is a Continuation application of Ser. No. 08/264,924, filed Jun. 24, 1994, now abandoned.

BACKGROUND OF THE INVENTION

The present invention, generally, relates to the field of simulation for training, entertainment and, more particularly, to the simulation of the correct forces a simulator user feels when actuating controls or touching objects in the simulated environment.

FIELD OF THE INVENTION

Flight simulators have been used since the 1930's for training pilots. Originally, the simulator provided the trainee with a cockpit similar to the aircraft cockpit, with gauges and controls physically similar to the components of the real aircraft being simulated and with a motion system tilting the simulated cockpit to simulate the changing directions of the forces due to acceleration acting on the crew.

In later years, displays were added to provide imagery corresponding to what the crew would see out the window. In the last several decades, out-the-window imagery is provided typically by computer image generators that synthesize a perspective image for a specified viewpoint.

Since about 1980, head-mounted displays have been used with flight simulators, particularly for research applications. A head-mounted display (HMD) is worn in the manner of over-sized goggles to provide images directly to a simulator user.

A tracker is used to determine the position and orientation of the user's head so that the image generator can produce an image for the correct viewpoint. Systems using an image generator, tracker and a head-mounted display are called virtual reality systems and have been used in a variety of situations, including training and entertainment.

With virtual reality apparatus for flight simulation, there is a possibility of generating not only the out-the-window imagery, but also images of the gauges, switches, and other elements of a cockpit interior. Doing so would potentially eliminate much of the need for most of the physical cockpit structure. Eliminating the physical controls and displays could potentially reduce the cost of simulators and could certainly increase the flexibility of using the simulator.

For example, the locations and appearance of controls and displays could be changed and relocated by changing the software in the image generator, which having to fabricate changes to the cockpit structure.

This would allow the simulator to be upgraded readily or to be used to determine the best of several alternative placements and appearances. The same simulator apparatus might also be used for training different aircraft.

There is a problem in achieving useful simulation of cockpit interiors, however. If only the images of controls are provided, then when the user attempts to actuate a control, there is no sensation of the knob, switch, or other object being touched.

Without the sensation of touching the controls, the simulator is unrealistic and its utility is limited. The most successful present solutions to providing the touch sensation today involve building a physical replica of the cockpit controls, a solution which gives up the flexibility easily repositioning the controls.

A more general solution is to provide the user with a glove that has mechanical apparatus attached to stimulate the sense of touch. One such glove design has air bladders that inflate under computer control to press against proximate portions of the fingers and hand. Another design uses an external skeleton apparatus which can be programmed to resist bending the joints.

Neither of these glove designs, however, can simulate a net external force of the type that occurs when pressing or twisting a control. For example, there is nothing to prevent the user from moving a hand through the simulated surfaces of the panels. Extra realism is provided by having a means of force simulation rather than just a means of touch simulation. While ordinary gloves are not encumbering, gloves having additional apparatus attached can be awkward.

For example, to achieve the best fidelity in simulating the primary controls of an aircraft, i.e., the throttle and stick or control yoke, it may be desirable to provide physical replicas of those controls while simulating others with varying levels of fidelity. Having encumbering apparatus attached to the hand adds to the difficulty of achieving a mixed-fidelity simulation of this sort.

While the structural arrangements of some prior apparatus may have, at first appearance, similarities the present invention, they differ in material respects. These differences, which will become more apparent as the description proceeds, are important for the effective use of the invention to achieve its advantages.

OBJECTS AND SUMMARY OF THE INVENTION

Therefore, it is an object of the invention to provide means of simulating the presence of touched objects in a virtual environment.

It is another object of the invention to provide an improved means of stimulating the sense of touch with minimum encumbrance.

Yet another object of the invention is to provide a means of simulation that represents external forces to a user.

Briefly, a virtual reality system that includes apparatus for simulating the forces associated with actuating controls in an aircraft or other simulator includes a panel that contains examples of the various types of switches and knobs that occur in a portion of the cockpit being simulated. The panel is attached as a payload of a robotic positioning mechanism the position of which is controlled by a computer.

DETAILED DESCRIPTION OF THE INVENTION

The present device solves many of the long-standing problems of providing accurate force feedback in a simulator. Generally, an object that a user seeks is supported by a robotic mechanism under computer control to place the object in exactly the right place just before the user touches it.

The robotic mechanism will hold the object fixed in place as long as it is being touched. A cockpit, with five hundred switches and knobs of ten different types, is simulated by a robotic positioning mechanism having only one example of each type.

Figure 1:
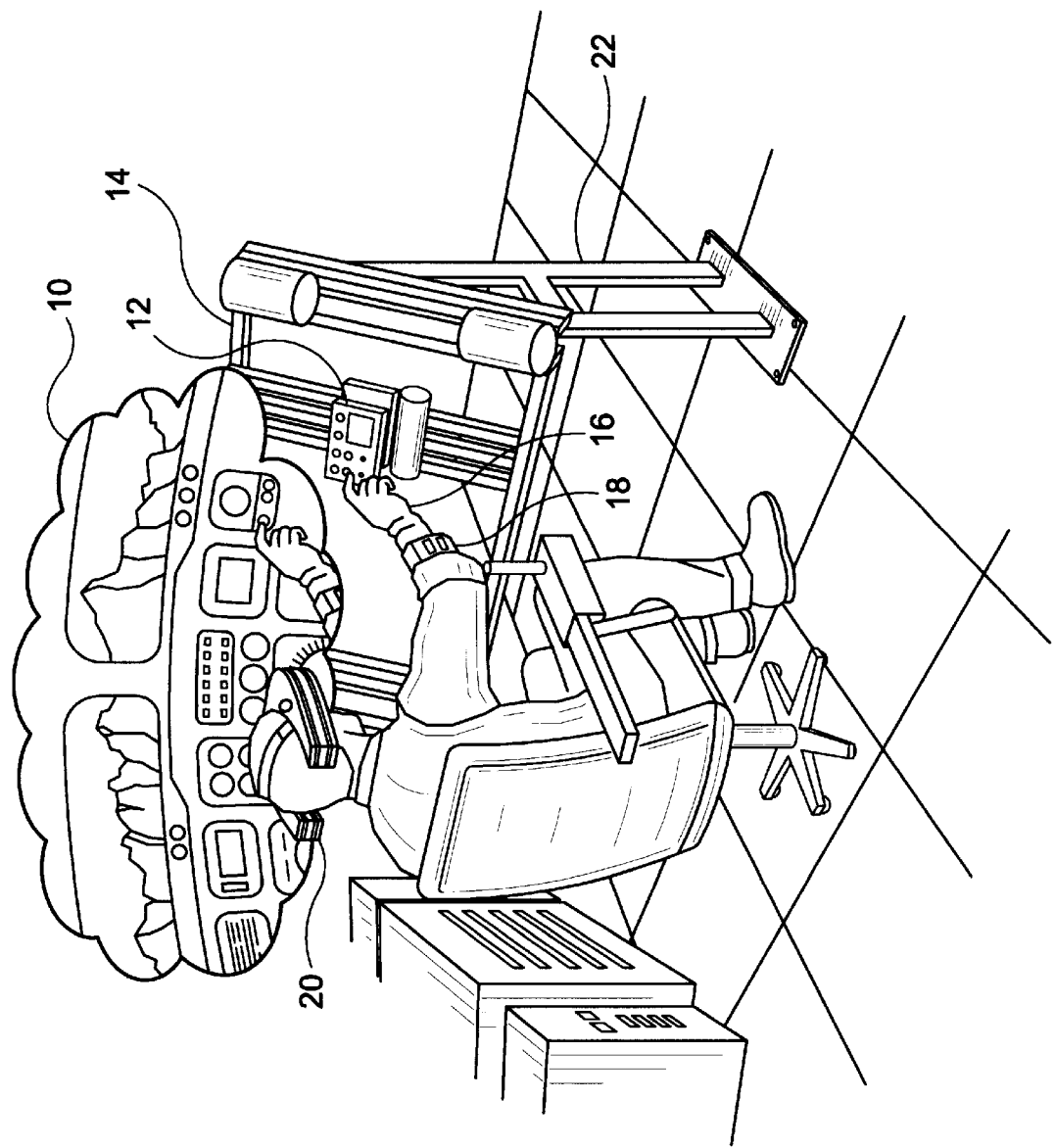
FIG. 1 illustrates a pictorial view of the system arranged in accordance with the present invention.

Referring now to FIG. 1, a user wears a head mounted display 20 that presents an image 10 of a cockpit environment that includes cockpit controls (e.g., switches and knobs) and cockpit displays. The user wears a data glove 16 and a tracker 18, that determine the positions of the user's fingers and hand, respectively.

When the user reaches for a cockpit control, a graphics image of the user's hand appears within the image 10 of the rest of the environment, so that the user may reach towards a selected control. The image of the cockpit typically shows many cockpit controls, any of which may be actuated by the user.

To provide the feel of actuating a control, there is a small panel 12 that is moved into position by a translational robotic positioning mechanism 14. The translational robotic positioning mechanism 14 is supported by a frame 22 so that the range of motion of the panel 16 covers the physical positions of switches to be accessed in the image 10.

The tracking data is used to position the payload panel also. In general, the position of the panel 12 mirrors the position of the hand. The robotic positioning mechanism 14 moves the panel 12 left or right and up or down to keep a minimum distance from the user's hand. The robotic positioning mechanism 14 keeps panel 12 close to the contours of the virtual control panel image 10 to minimize the fast motion that must occur to place the correct control in position once the user's intent is made clear by the approach of the hand.

Figure 2:
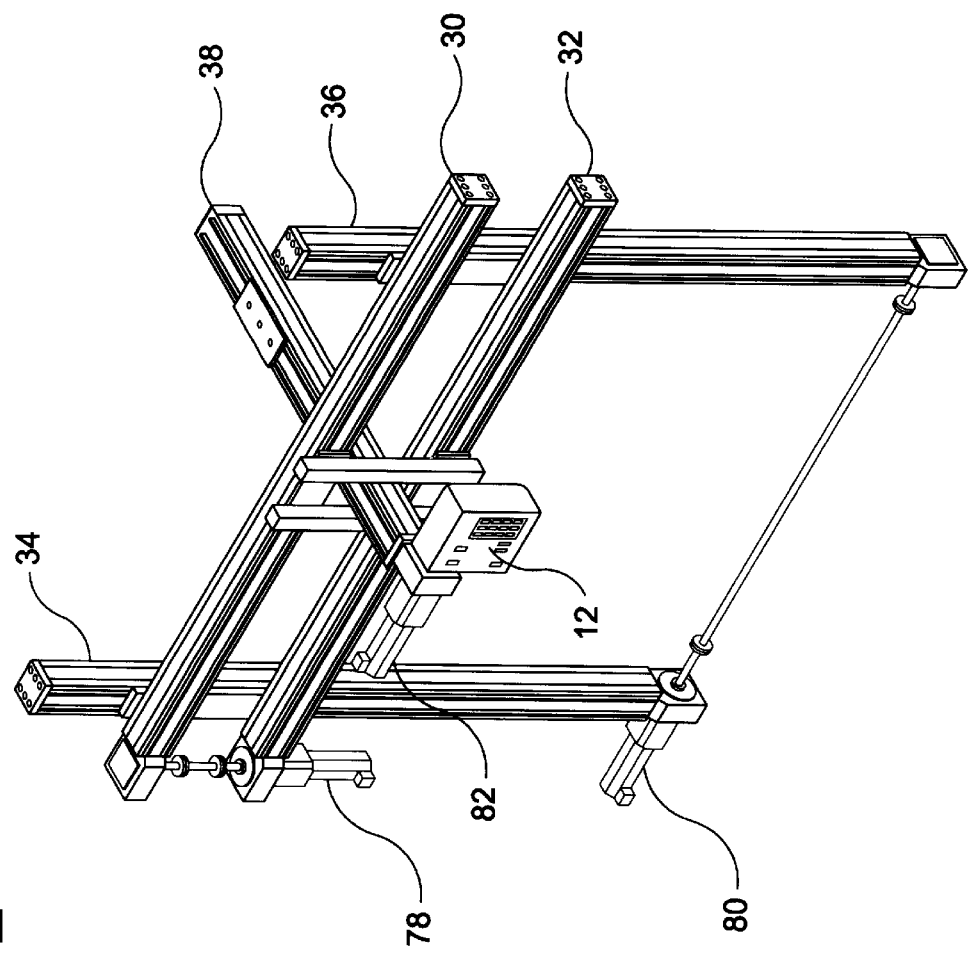
FIG. 2 is an illustration of a translational robotic positioning mechanism with a panel payload according to the principles of the present invention.

Referring next to FIG. 2, the robotic positioning mechanism 14 includes liner motion module tracks for moving the panel 12 in three dimensions. The vertical (y-axis) tracks 34 and 36 translate the horizontal (x-axis) motion tracks 30 and 32. The x-axis motion tracks 30 and 32 carries the z-axis motion module 38. The panel 12 is carried by the z-axis motion track.

Figure 3:
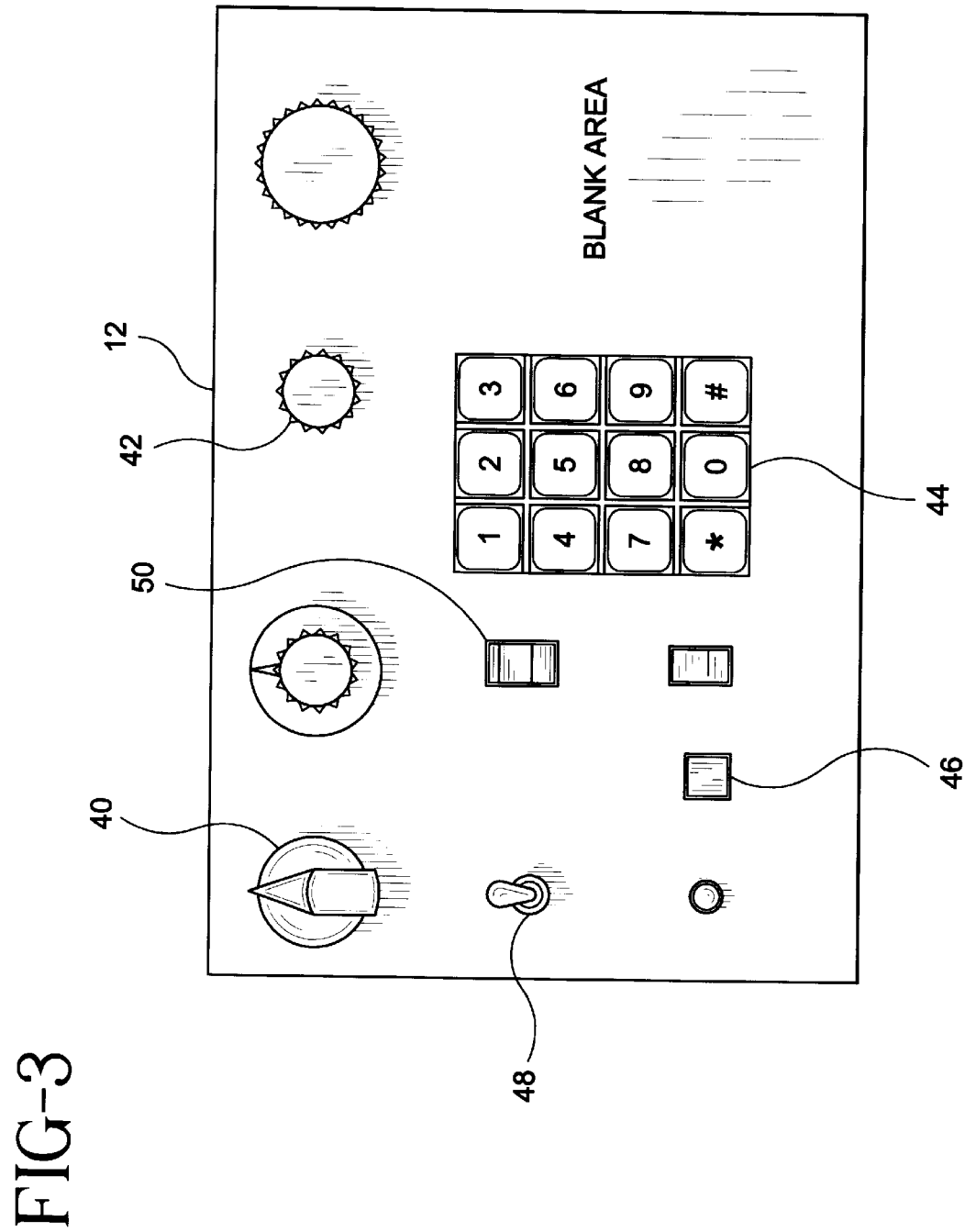
FIG. 3 is an illustration of the front of the panel payload that is illustrated in FIG. 2.

Now, in FIG. 3 of the drawings, the panel 12 carries a small assortment of switches. A push button switches 46 always returns to a neutral position after being pressed, so the user always encounters a push button in its normal state.

Toggle switches 48 and 50 each have two different physical states, "up" or "down" which can be differentiated by touch. A knob with a pointer 40 with detentes has many distinguishable states, and a rotary control 42 has a continuously variable state.

The mechanism 14 of the invention provides several ways of ensuring that a user encounters the correct state of the controls to be actuated. One is to include means for rotating the entire panel 12. If a toggle switch is supposed to be "up", the robotic positioning mechanism 14 can rotate the panel 12 180 degrees, if necessary, to present it as "up", and other knobs may similarly be changed by rotating the panel 12 as required.

A second way is to make special switches and knobs having solenoids or motors that will move them into a correct position under computer control. This may be preferred for controls like sliders, and it is preferred for it speed in setting the positions.

To avoid having to move the panel 12 too quickly, it may be better to use groups of adjacent switches on the panel 12 when switches in a group are customarily accessed in rapid succession. A keyboard 44 is implemented with fixed, real hardware.

Similarly, main controls (a joystick, a control yoke, a throttle control, and rudder foot pedals) will often be best implemented with fixed, real hardware. A few fixed controls of this type are generally not much of a drawback to the cost and flexibility advantages of a force feedback arrangement according to the present invention.

Many types of knobs and switches can be depicted visually, while there is a fewer physical number of such controls on the panel 12. The sense of touch does not discriminate as accurately as does the visual sense, so approximate shapes are acceptable.

Virtual reality systems without force feedback are well known in the prior art. These virtual reality systems include a host computer for running control software, a head tracker which measure the direction of view, an image generator which creates an image of the simulated world and which drives a head mounted display 20, and an audio system for recreating the sounds expected in the virtual environment.

Figure 4:
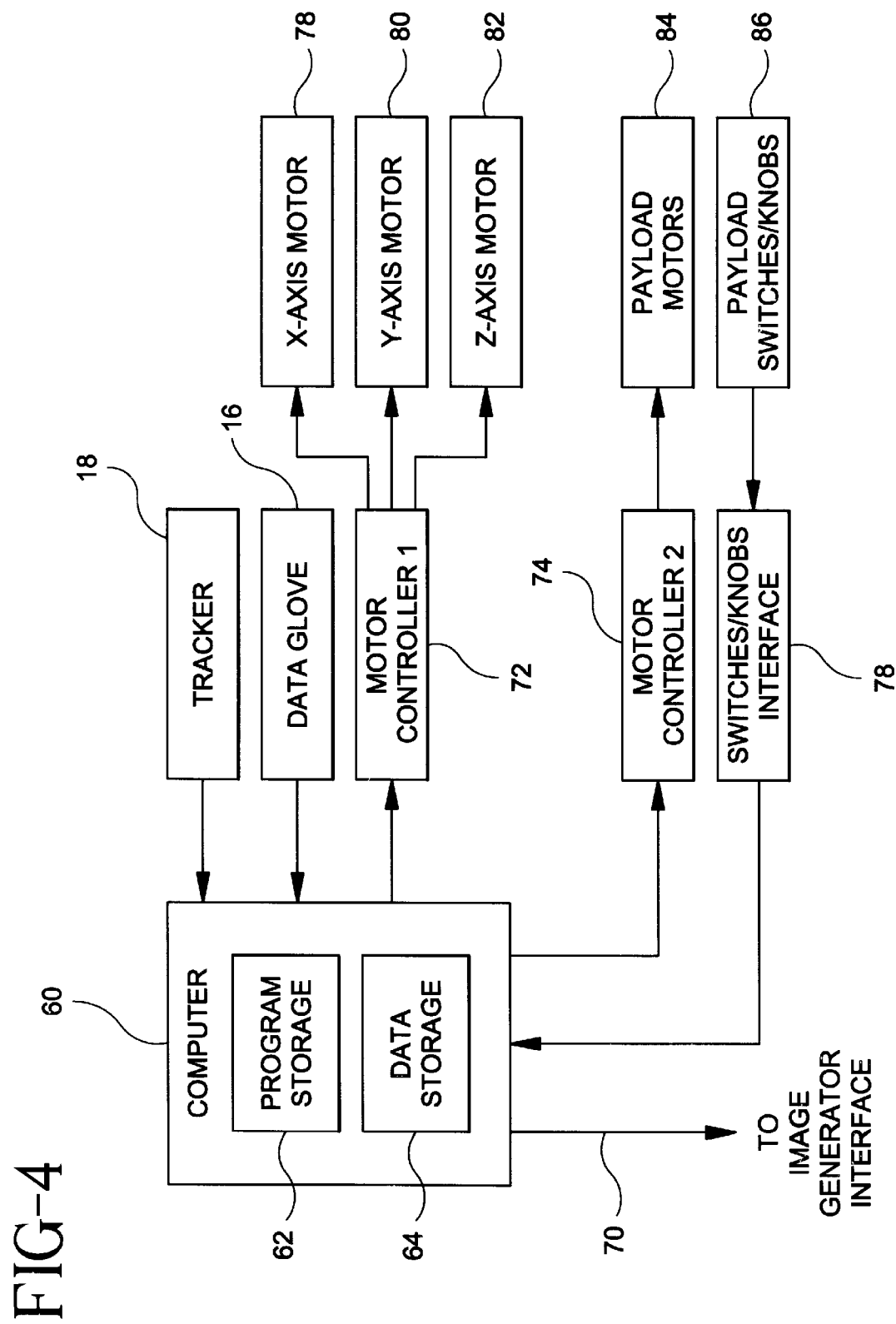
FIG. 4 is a block diagram to illustrate a system constructed and arranged in accordance with the invention.

FIG. 4 is a block diagram to illustrate the present invention and includes a connection 70 to interface with the image generator of a virtual reality system. The connection 70 provides data giving the position of the hand and fingers so that the virtual reality system can render an image of the user's hand in proximity to the controls in the virtual environment.

The connection 70 also transfers data concerning the new positions of switches and knobs. The virtual reality system and the force feedback system must have consistent data describing the positions of controls in the virtual environment and how they are operated. This information is predetermined, with one copy stored in the data storage 64 of the force feedback system's computer 60.

The computer 60 executes a control program in its program storage 64. The program receives data from a tracker 18, which measures the position of the user's hand and from the data glove 16, which measures the positions of the fingers relative to the hand. The computer 60 also receives through a switch/knobs interface 76 data from electronics 86 in the panel 12 that measures the switch and knob positions.

A program controls the position of the panel 12 by sending signals to a multi-channel motor controller 72. This motor controller 72 drives the three motors 78, 80 and 82 on the x, y and z axes, respectively, of the robotic positioning mechanism 14. The computer 60 also controls a second motor controller 74 which, in turn, drives motors 84 in the panel 12 which sets the controls into their correct physical positions.

Figure 5:
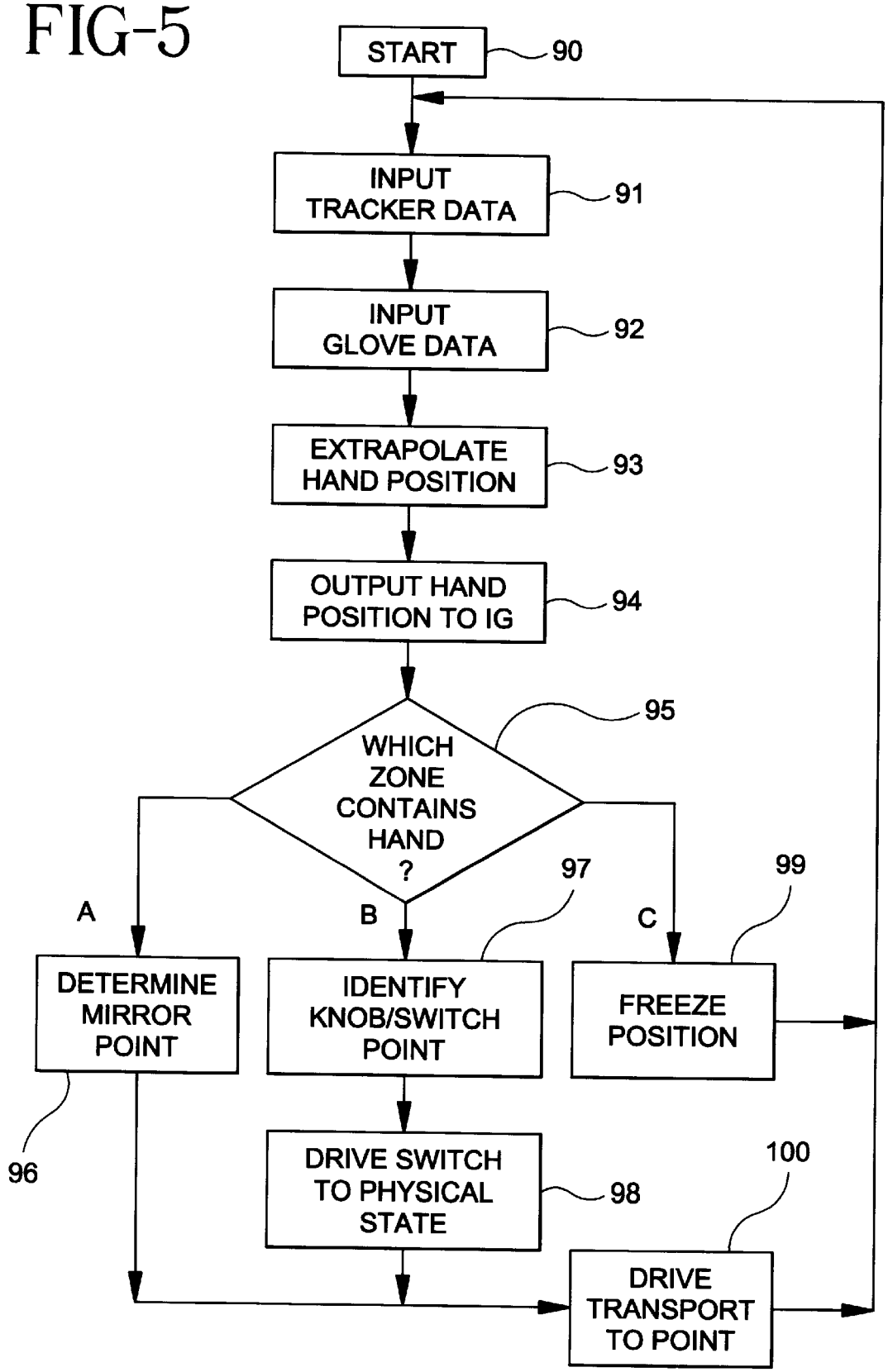
FIG. 5 is a flow chart of the control logic for the system of the present invention.

FIG. 5 is a flow chart of the control software that is executed by the computer 60. Once initiated from the starting step 90, the program runs in a continual loop for the duration of the simulation. The loop begins by requesting and receiving tracker data in step 91 from the tracker 18. It then requests and receives glove data in step 92 from the data glove 16. These data are stored to form a sequence, from which the future position of the hand and of the fingers are predicted by extrapolation in step 93.

Extrapolation is needed to compensate for delays in the image generator in the virtual reality system, to which data is sent in step 94 and to compensate for lags in positioning the panel 12. In step 95, the predicted position of the hand is compared to the stored database 64 that describes the virtual environment.

The virtual environment is divided into three predetermined volumes designated as zone A, zone B. and zone C. Zone A contains the user and the space up to about six inches from the surfaces in the virtual environment that show the knobs and switches. Zone B extends from the bounds of Zone A to approximately 0.5 inch of the knobs and switches and their supporting structure.

The exact boundaries of the zones will vary with the details of the application. A faster positioning device allows smaller Zones B and C. The more widely spaced the knobs and switches the larger zones B and C can be.

If step 95 determines the hand to be in zone A, program control is passed to step 96, determination of the mirror point. The mirror point is the closest point to the extrapolated position of the user's hand which is no closer that the surfaces in the virtual environment that show the knobs and switches. In the subsequent step 100, the panel 12 is driven to the mirror point. By keeping the payload panel near the user's hand, the time to make the final position adjustment to place a particular switch or knob under the hand is minimized.

If step 95 determines the hand is in zone B. program control is passed to step 97. Step 97 identifies which particular knob or switch is being reached by the user. The identification is made by selecting the knob or switch which is closest to the extended path of the hand. The positions of the knobs and switches are predetermined and stored in the data storage 64.

Once the switch is identified, the physical state of the switch is looked up in step 98, and in the next step, the switch is driven via the motor controller 74 to the position it had when it was last activated. In the subsequent step 100, the panel 12 is driven so the identified switch is in the correct position to be touched by the user.

If step 95 determines the hand is in zone C, program control in passed to step 99. If the hand in in zone C, the switch or knob is either just about to be touched, or about to be released. In step 99, the setting of the switch or knob is read via interface 76 and is stored for future reference. The switch or knob data is communicated also via the connection 70 to the virtual reality system image generator.

After completion of either steps 99 or 100, program control is returned 101 to step 91 and the cycle repeats.

Two or more force feedback apparatus can be used to simulate an environment. Using two or more of these apparatus permits covering a larger area, accommodates the user actuating controls with both hands simultaneously, accommodates more different types of controls, and increases the access speed.

In an immersion virtual reality environment, the user wears headphones as well as an HMD. The headphones provide simulated environmental sounds as well as voice communications whenever the latter is needed. The headphones also will block any noise generated by the robotic position mechanism 14, so that the force feedback apparatus will be neither seen nor heard.

The tracker and data glove provide measurements of the positions of a user's hand and fingers to the computer, establishing a trajectory of the user's hand and fingers over time. The computer uses the trajectory data to decide how to control the position the payload of the robotic device.

When the user's hand is relatively far from any control, the payload is moved to an approximate position opposite the hand, but no nearer than the simulated position of the surface bearing the controls. As the hand approaches a control, the computer extrapolates the trajectory, determines that control the user intends to activate, and moves the corresponding sample control towards the correct position to be touched. When the hand is close to the control, the position of the payload panel is fixed so the user can touch and activate the real control.

Controls that have varying physical states, such as a two position toggle switch or a rotary switch, have means to be positioned under control of the computer. When the computer determines which control is to be actuated, it commands the control to be set to the correct physical state while it is also being put in the correct location.

A suitable data glove is manufactured by Virtual Technologies. The computing requirements may be met with a contemporary personal computer using, for example, an Intel Pentium processor. Motor controllers and computer interfaces are commercially available.

It should be understood that the foregoing description is only illustrative of a preferred embodiment of the invention. Various alternatives and modifications can be devised by those skilled in the art without departing from the spirit and scope of the invention.

What is claimed is:

1. Apparatus for providing force feedback to a user in a virtual reality simulation system, said apparatus comprising:
    means for generating a visual scene directly to the eye of said user;
    said visual scene including a predetermined number of objects of different types in predetermined locations to be selected and touched by said user while operating said simulation system;
    panel means supporting at least one actual object of each type of said objects in said visual scene;
    means for sensing the state of said actual object after it is touched by said user;
    means for providing said user with a force feedback indicative of the correct position of said object after it has been actuated;
    robotic positioning means including means attached mechanically to said panel means for moving said actual objects to predetermined locations;
    means for determining the positions of the fingers of said user's hand and generating measurements indicative of said positions;
    computer means including means for storing programs and means for storing data, and having means connected with said means for determining the positions of fingers of said user's hand; and
    a control program stored in said means for storing programs for computing the positions of said user's fingers relative to the locations of objects in said visual scene, and connecting commands to said robotic positioning means;
    whereby said panel means is positioned so that said actual object selected and touched provides a force feedback to said user.

2. The apparatus of claim 1, wherein said means for determining the positions of the fingers of said user's hand comprises an electromagnetic tracker and a data glove.

3. The apparatus of claim 1, wherein said panel includes support for at least one switch means and at least one rotary control means.

4. The apparatus of claim 1, wherein said robotic positioning means is in the form of a translational positioning device having independent horizontal and vertical positioning means.

5. The apparatus of claim 4, wherein said transitional positioning device includes independent positioning means in an x-axis, a y-axis and a z-axis.

6. The apparatus of claim 1, further including a database containing the positions of a plurality of switches and a plurality of knobs in said visual scene is stored in said means for storing data in said computer means.

7. The apparatus of claim 1, wherein said at least one actual object of each type supported by said panel means has a physical state preset in accordance with the state of objects described in a database stored in said computer means.

8. The apparatus of claim 1 further including means for setting the physical state of an object under control of said computer means whereby the state is set in accordance with data in said means for storing data in said computer means.

9. The apparatus of claim 1 wherein a selected object is a switch having at least two physical states, said physical states being the switch positions.

10. The apparatus of claim 9, wherein said means for setting said physical state includes a stepper motor mechanically coupled to said switch.

11. The apparatus of claim 9, further including means for electronically connecting said sensed state of said switch, after said physical state is preset, to said computer means.

12. The apparatus of claim 11, wherein said means for electronically connecting said preset physical state of said switch further includes means for retrieving data concerning said sensed physical state of the switch.

* * * * *